US012026490B2

(12) United States Patent
Liu et al.

(10) Patent No.: US 12,026,490 B2
(45) Date of Patent: Jul. 2, 2024

(54) METHOD FOR OBTAINING VEHICLE DIAGNOSIS SOFTWARE, SERVER AND DIAGNOSIS DEVICE (71) Applicant: LAUNCH TECH CO., LTD, Guangdong (CN)

(72) Inventors: Jun Liu, Guangdong (CN); Xiangmin Xu, Guangdong (CN); Zhenwen Bao, Guangdong (CN); Liling Yan, Guangdong (CN)

(73) Assignee: LAUNCH TECH CO., LTD, Guangdong (CN)

( * ) Notice: Subject to any disclaimer, the term of this patent is extended or adjusted under 35 U.S.C. 154(b) by 536 days.

(21) Appl. No.: 17/287,124

(22) PCT Filed: May 29, 2020

(86) PCT No.: PCT/CN2020/093174
§ 371 (c)(1),
(2) Date: Apr. 21, 2021

(87) PCT Pub. No.: WO2021/237651
PCT Pub. Date: Dec. 2, 2021

(65) Prior Publication Data
US 2022/0308570 A1 Sep. 29, 2022

(51) Int. Cl.
*G06F 8/60* (2018.01)
*G05B 23/02* (2006.01)
(Continued)

(52) U.S. Cl.
CPC ........... *G06F 8/60* (2013.01); *G05B 23/0213* (2013.01); *G06F 8/65* (2013.01); *G06F 8/71* (2013.01); *G07C 5/0808* (2013.01)

(58) Field of Classification Search
CPC ..... G06F 8/60; G06F 8/65; G06F 8/71; G05B 23/0213; G07C 5/0808
See application file for complete search history.

(56) References Cited

U.S. PATENT DOCUMENTS 5,278,759 A * 1/1994 Berra .................. G06F 8/65
701/1
6,874,680 B1 * 4/2005 Klaus .................. G06F 8/65
235/375
(Continued)

FOREIGN PATENT DOCUMENTS

CN 101252472 A 8/2008
CN 102354207 A 2/2012
(Continued)

OTHER PUBLICATIONS

Translation of CN-107992321-A, 8 pages (Year: 2018).*
(Continued)

*Primary Examiner* — Dale W Hilgendorf
(74) *Attorney, Agent, or Firm* — Yue (Robert) Xu; Apex Attorneys at Law, LLP (57) ABSTRACT Provided are a method for obtaining vehicle diagnosis software, a server and a diagnosis device. In the method, the diagnosis device sends an acquisition request of target diagnosis software to the server based on a target vehicle, where the acquisition request includes a vehicle identification code; the server determines whether the target vehicle has an authorization qualification of the target diagnosis software based on the acquisition request, to obtain a determination result; the server performs an operation based on the determination result. Only the target vehicle with the authorization qualification can download the software, realizing the flexible configuration of the diagnosis device and configuring the diagnosis device based on user's actual requirement to complete the vehicle diagnosis, and reducing waste of resources.

14 Claims, 4 Drawing Sheets (51) Int. Cl.
*G06F 8/65* (2018.01)
*G06F 8/71* (2018.01)
*G07C 5/08* (2006.01)

(56) References Cited

U.S. PATENT DOCUMENTS

| | | | | |
|---|---|---|---|---|
| 8,930,067 | B1* | 1/2015 | Green | H04W 12/084 |
| | | | | 705/7.41 |
| 2005/0065678 | A1* | 3/2005 | Smith | G07C 5/008 |
| | | | | 701/1 |
| 2007/0005204 | A1 | 1/2007 | Yamamoto et al. | |
| 2009/0112397 | A1* | 4/2009 | Roberts | G07C 5/008 |
| | | | | 705/1.1 |
| 2014/0109075 | A1* | 4/2014 | Hoffman | G06F 11/1464 |
| | | | | 717/169 |
| 2015/0113520 | A1* | 4/2015 | Kotani | G06F 8/65 |
| | | | | 717/172 |
| 2015/0317243 | A1* | 11/2015 | Green | G06Q 20/127 |
| | | | | 714/38.1 |
| 2016/0196131 | A1* | 7/2016 | Searle | H04L 65/40 |
| | | | | 717/173 |
| 2016/0364225 | A1* | 12/2016 | Moeller | H04L 67/12 |
| 2019/0163466 | A1* | 5/2019 | Kiyama | H04W 4/44 |
| 2020/0065087 | A1* | 2/2020 | Miura | H04L 67/34 |
| 2021/0014318 | A1* | 1/2021 | Xiao | H04L 67/01 |
| 2022/0188434 | A1* | 6/2022 | Liu | G06F 21/31 |
| 2024/0071148 | A1* | 2/2024 | Liu | G06F 8/65 |

FOREIGN PATENT DOCUMENTS

| | | | | |
|---|---|---|---|---|
| CN | 105955240 | A | | 9/2016 |
| CN | 107102873 | A | | 8/2017 |
| CN | 107426149 | A | | 12/2017 |
| CN | 107992321 | A * | 5/2018 | G06F 11/1004 |
| CN | 108459576 | A | | 8/2018 |
| CN | 108459576 | A * | 8/2018 | G05B 23/0213 |
| CN | 108521459 | A * | 9/2018 | G07C 5/008 |
| CN | 109164791 | A * | 1/2019 | G05B 23/0213 |
| CN | 109358611 | A * | 2/2019 | G05B 23/0221 |
| CN | 109358611 | A | | 2/2019 |
| CN | 109491671 | A * | 3/2019 | G06F 8/61 |
| CN | 109491671 | A | | 3/2019 |
| CN | 109933051 | A * | 6/2019 | G05B 23/02 |
| CN | 109933051 | A | | 6/2019 |
| CN | 110602036 | A | | 12/2019 |
| CN | 111191285 | A | | 5/2020 |
| CN | 111742354 | A * | 10/2020 | G07C 5/008 |

OTHER PUBLICATIONS

Translation of CN-108459576-A, 3 pages (Year: 2018).*
Translation of CN-108521459-A, 16 pages (Year: 2018).*
Translation of CN-109164791-A, 16 pages (Year: 2019).*
Translation of CN-109358611-A, 10 pages (Year: 2019).*
Translation of CN-109491671-A, 13 pages (Year: 2019).*
Translation of CN-109933051-A, 10 pages (Year: 2019).*
Translation of CN-111742354-A, 16 pages (Year: 2020).*
International Search Report for PCT/CN2020/093174 mailed Mar. 2, 2021, ISA/CN.
The Chinese 1st Office Action issued on Oct. 10, 2022 for CN202080001069.X.
The Chinese 2nd Office Action issued on Mar. 7, 2023 for CN202080001069.X.

* cited by examiner

METHOD FOR OBTAINING VEHICLE DIAGNOSIS SOFTWARE, SERVER AND DIAGNOSIS DEVICE

This application is the national phase of International Application No. PCT/CN2020/093174, titled "METHOD FOR OBTAINING VEHICLE DIAGNOSIS SOFTWARE, SERVER AND DIAGNOSIS DEVICE", filed on May 29, 2020, which is incorporated herein by reference in its entirety.

FIELD

The present disclosure relates to the technical field of vehicle diagnosis, and in particular to a method for obtaining vehicle diagnosis software, a server and a diagnosis device.

BACKGROUND

For the vehicle fault diagnosis in the conventional technology, it is required to read data from a vehicle electronic control unit, through a professional diagnosis software configured by a diagnosis device, for determination and processing. However, the diagnosis software configured by the diagnosis device is generally configured by a manufacturer of the diagnosis device before delivery, or obtained and used by a user after getting the device. Currently, a diagnosis software package configured by the diagnosis device is usually large, which basically includes all diagnosis software of mainstream vehicle types. However, what is needed in an actual diagnosis process is only the diagnosis software of the vehicle type corresponding to the to-be-diagnosed vehicle. For example, vehicles of a brand of Volkswagen™ require only the diagnosis software of Volkswagen™ during diagnosis, and do not require diagnosis software of other vehicle types such as Buick™. Therefore, it is an urgent problem to be solved that how to obtain and configure vehicle diagnosis software flexibly, so as to improve the utilization rate of diagnosis software for a vehicle type.

SUMMARY

A method for obtaining vehicle diagnosis software, a server and a diagnosis device are provided in the present disclosure, so that the diagnosis device may be configured flexibly based on the actual requirement of a user, to complete the vehicle diagnosis and reduce a waste of resources. The specific solutions are as follows.

According to a first aspect, a method for obtaining vehicle diagnosis software, applied to a server, is provided in the present disclosure. The method includes:
   receiving an acquisition request of target diagnosis software sent by a diagnosis device based on a target vehicle, where the acquisition request includes a vehicle identification code;
   determining whether the target vehicle has an authorization qualification of the target diagnosis software based on the acquisition request, to obtain a determination result; and
   performing an operation based on the determination result.

According to a second aspect, a method for obtaining vehicle diagnosis software, applied to a diagnosis device, is provided in the present disclosure. The method includes:
   obtaining a vehicle identification code of a target vehicle;
   generating an acquisition request of target diagnosis software based on the vehicle identification code;
   sending the acquisition request to a server, for the server to determine whether the target vehicle has an authorization qualification of the target diagnosis software and perform an operation based on a determination result; and
   receiving an operation result fed back by the server.

According to a third aspect, a server is provided in the present disclosure. The server includes:
   a memory, configured to store an executable computer program; and
   a processor, configured to call the executable computer program to perform the following steps:
       receive an acquisition request of target diagnosis software sent by a diagnosis device based on a target vehicle, where the acquisition request includes a vehicle identification code;
       determine whether the target vehicle has an authorization qualification of the target diagnosis software based on the acquisition request, to obtain a determination result; and
       perform an operation based on the determination result.

According to a fourth aspect, a diagnosis device is provided in the present disclosure. The diagnosis device includes:
   a memory, configured to store an executable computer program; and
   a processor, configured to call the executable computer program to perform the following steps:
       obtain a vehicle identification code of a target vehicle;
       generate an acquisition request of target diagnosis software based on the vehicle identification code;
       send the acquisition request to a server, for the server to determine whether the target vehicle has an authorization qualification of the target diagnosis software and perform an operation based on a determination result; and
       receive an operation result fed back by the server.

A method for obtaining vehicle diagnosis software is provided in the present disclosure. In the method, an acquisition request of target diagnosis software sent by a diagnosis device based on a target vehicle is received by the server, where the acquisition request includes a vehicle identification code; it is determined whether the target vehicle has an authorization qualification of the target diagnosis software based on the acquisition request, to obtain a determination result; and an operation is performed based on the determination result.

It can be seen that in the present disclosure, the server determines whether the target vehicle has an authorization qualification of the target diagnosis software based on the acquisition request, and obtains a determination result. Only the target vehicle with the authorization qualification can download the software, and realize configuration of the diagnosis device. The diagnosis device can be flexibly configured based on an actual requirement of a user, to complete the vehicle diagnosis, thus reducing a waste of resources.

BRIEF DESCRIPTION OF THE DRAWINGS

In order to clearly illustrate the technical solutions in the embodiments of the present disclosure or in the conventional technology, the drawings to be used in the description of the embodiments or the conventional technology will be described briefly as follows. Apparently, the drawings in the following description only illustrate the embodiments of the present disclosure, and other drawings may be obtained by those skilled in the art based on these drawings without any creative work.

DETAILED DESCRIPTION OF THE EMBODIMENTS

In order to make the objectives, technical solutions and advantages of embodiments of the present disclosure clearer, the technical solutions in embodiments of the present disclosure will be described clearly and completely hereinafter in conjunction with the drawings of the embodiments of the present disclosure. All other embodiments obtained based on the embodiments of the present disclosure by those skilled in the art without any creative efforts fall within the protection scope of the present disclosure.

Figure 1:
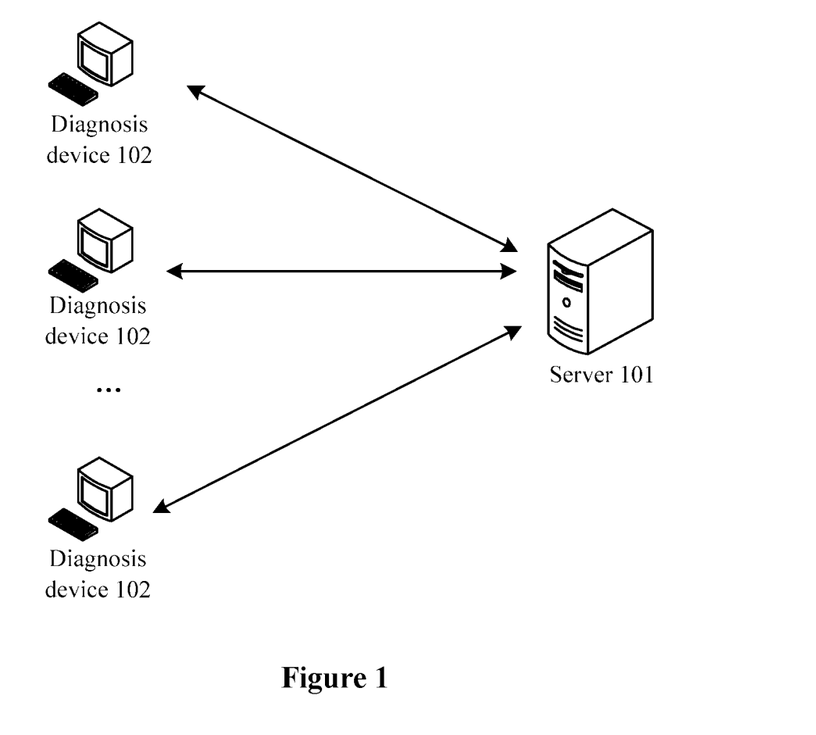
FIG. 1 is a schematic structural diagram showing a system for a method for obtaining vehicle diagnosis software according to an embodiment of the present disclosure.

Diagnosis software required in the existing vehicle fault diagnosis is either configured by the manufacturer of the diagnosis device before delivery, or obtained and used by a user after getting the device. Currently, a diagnosis software package configured by the diagnosis device is commonly large, which includes all diagnosis software corresponding to mainstream vehicle types. However, in an actual diagnosis process, it is only required the diagnosis software for the vehicle type corresponding to the to-be-diagnosed vehicle. Thus, the user cannot flexibly configure vehicle diagnosis software, resulting in a waste of resources. Based on the above technical problem, a method for obtaining vehicle diagnosis software is provided in the embodiment. With the method, the diagnosis device is configured flexibly based on the user's actual requirements, to complete the vehicle diagnosis and reduce a waste of resources. Reference is made to FIG. 1, which is a schematic structural diagram showing a system for a method for obtaining vehicle diagnosis software according to an embodiment of the present disclosure.

A system for obtaining vehicle diagnosis software according to the present disclosure includes a server 101 and a diagnosis device 102.

The server 101 may include a processor, a memory and the like, which can communicate with the diagnosis device 102 via a communication interface by using a communication network, to realize data interaction. The server 101 determines whether a target vehicle has an authorization qualification of target diagnosis software based on an acquisition request sent by the diagnosis device 102, to obtain a determination result, and performs an operation based on the determination result.

The diagnosis device 102 may provide a user with an input interface for an acquisition instruction and a trigger unit for the acquisition instruction on a user interaction interface by a client installed on itself. The user interaction interface may further include a variety of display and reminder information. After the acquisition instruction is triggered by the outside, the diagnosis device 102 obtains a vehicle identification code of the target vehicle and generates the acquisition request of the target diagnosis software based on the vehicle identification code. The diagnosis device 102 may send the acquisition request to the server 101 through the communication network, and receive an operation result fed back by the server 101 through the communication network. It should be noted that the above-mentioned communication network in the present disclosure may be determined based on network conditions and application requirements during an actual application process. It may be a wireless communication network, such as a mobile communication network or a Wi-Fi network, or a wired communication network; it may be a wide area network, or a local area network when the situation permits, which is not limited herein.

Figure 2:
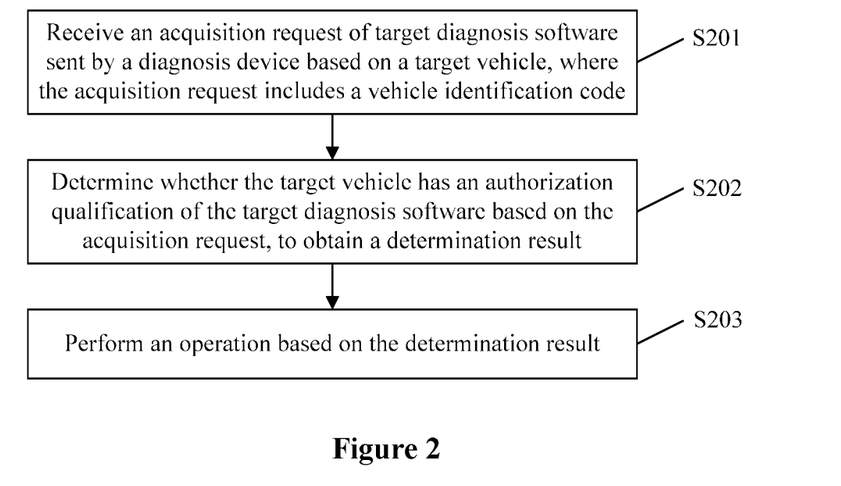
FIG. 2 is a flowchart showing a method for obtaining vehicle diagnosis software according to an embodiment of the present disclosure.

Reference is made to FIG. 2, which is a flowchart showing a method for obtaining vehicle diagnosis software according to an embodiment of the present disclosure. The method is applied to a server and includes steps S201 to S203.

In step S201, an acquisition request of target diagnosis software sent by a diagnosis device based on a target vehicle is received, where the acquisition request includes a vehicle identification code.

The acquisition request is used for the diagnosis device to request the target diagnosis software from the server. The acquisition request includes the vehicle identification code. The vehicle identification code includes but is not limited to, a vehicle identification number (VIN) code, a license plate, and a two-dimensional code that uniquely marks the vehicle. After obtaining the vehicle identification code, the diagnosis device generates the acquisition request of the target diagnosis software based on the vehicle identification code, and sends the acquisition request to the server.

In step S202, it is determined whether the target vehicle has an authorization qualification of the target diagnosis software based on the acquisition request, to obtain a determination result.

Specifically, the determining whether the target vehicle has an authorization qualification of the target diagnosis software based on the acquisition request to obtain a determination result includes: obtaining diagnosis software authorization information and target diagnosis software information based on the vehicle identification code; determining whether the acquisition request and the target diagnosis software information match the diagnosis software authorization information; and determining that the target vehicle has the authorization qualification of the target diagnosis software, if the acquisition request and the target diagnosis software information match the diagnosis software authorization information.

In a specific embodiment, a vehicle type of the target vehicle may be determined based on the vehicle identification code, thus to determine the target diagnosis software information corresponding to the target vehicle. A VIN code is taken as the vehicle identification code for illustration. For example, the VIN code of the target vehicle is LSGKE5411LW058831, it is determined based on the VIN code that the vehicle type is Buick® EXCELLE 2019, and further determined that the corresponding target diagnosis software is the diagnosis software for Buick™ EXCELLE 2019. In another example, the VIN code of the target vehicle is LVSHCAAN9FE249549, it is determined based on the VIN code that the vehicle type is Ford™ FOCUS 2015, and further determined that the corresponding target diagnosis software is the diagnosis software for Ford™ FOCUS 2015. The determination of the target diagnosis software information based on the vehicle identification code has following ways. One way is that the target diagnosis software information is determined after the diagnosis device obtains the vehicle identification code, then packaged into the acquisition request of the target diagnosis software and sent to the server. The other way is that the target diagnosis software information is not determined by the diagnosis device but determined by the server based on the vehicle identification code in the acquisition request sent by the diagnosis device, which is not limited herein In a specific embodiment, the server pre-stores a database of the diagnosis software authorization information based on the vehicle identification code. The database of the diagnosis software authorization information includes a large number of vehicle identification codes and diagnosis software authorization information, and pre-establishes a mapping relationship between the vehicle identification codes and diagnosis software authorization information. One vehicle identification code may correspond to one piece of diagnosis software authorization information, or correspond to multiple pieces of diagnosis software authorization information. After receiving the acquisition request of the target diagnosis software, the server queries, based on the vehicle identification code in the acquisition request, whether there is the vehicle identification code in the information database. If the vehicle identification code is in the database, it is to further determine the diagnosis software authorization information based on the mapping relationship. A VIN code is taken as the vehicle identification code for further illustration. After the server receives the acquisition request of the target diagnosis software, if it is determined by analysis that the VIN code is LSGKE5411LW058831, the server first queries whether the VIN code is in the information database. If the VIN code is in the database, it is to further determine the diagnosis software authorization information based on the mapping relationship. If the VIN code is not in the database, it is determined that the target vehicle does not have an authorization qualification of the target diagnosis software.

In a specific embodiment, the acquisition request further includes requested usage period of the target diagnosis software, and the diagnosis software authorization information includes authorized diagnosis software information and an authorization period. After obtaining the target diagnosis software information and the diagnosis software authorization information based on the vehicle identification code, it may be further determined whether the acquisition request and the target diagnosis software information match the diagnosis software authorization information. Specifically, it is first determined whether the target diagnosis software information matches the authorized diagnosis software information. If the target diagnosis software information matches the authorized diagnosis software information, it is further determined whether the requested usage period falls within the authorization period. If the requested usage period falls within the authorization period, it is determined that the target vehicle has the authorization qualification of the target diagnosis software. If it is determined that the target diagnosis software information does not match the authorized diagnosis software information, or the requested usage period does not fall within the authorization period, it is determined that the target vehicle does not have the authorization qualification of the target diagnosis software. The acquisition request of the target diagnosis software including a VIN code is taken as an example. The acquisition request includes a VIN code of LSGKE5411LW05883 and requested usage period from 14:00 to 18:00, Apr. 5, 2020. First, it is determined based on the VIN code that the target diagnosis software is the diagnosis software for Buick™ Excelle EXCELLE 2019. It is determined by query of the server that the diagnosis software authorization information corresponding to the VIN code is as follows: the authorized diagnosis software information is the diagnosis software for Buick™ EXCELLE 2019, and the authorization period is from 19:00, Apr. 4, 2020 to 19:00, Apr. 5, 2020. Then, it is further determined by analysis that the target diagnosis software and the authorized diagnosis software both are the diagnosis software for Buick™ EXCELLE 2019, and thus it is determined that the target diagnosis software matches the authorized diagnosis software, and the requested usage period falls within the authorization period. Therefore, it is determined that the target vehicle has the authorization qualification of the target diagnosis software. If it is queried by the server based on the VIN code that, in the diagnosis software authorization information, the authorized diagnosis software is diagnosis software for Buick™ REGAL 2019 and the authorization period is from 8:00, Apr. 5, 2020 to 8:00, Apr. 6, 2020, then it is determined by analysis that the target diagnosis software does not match the authorized diagnosis software, and thus it is determined that the target vehicle does not have the authorization qualification of the target diagnosis software. If it is queried by the server based on the VIN code that, in the diagnosis software authorization information, the authorized diagnosis software is diagnosis software for Buick™ EXCELLE 2019 and the authorization period is from 10:00, Apr. 3, 2020 to 10:00, Apr. 4, 2020, then it is determined by analysis that the target diagnosis software matches the authorized diagnosis software, but the requested usage period does not fall within the authorization period. Thus, it is determined that the target vehicle does not have the authorization qualification of the target diagnosis software.

Further, after the target vehicle has the authorization qualification of the target diagnosis software, the diagnosis device may obtain and use the target diagnosis software. If the usage period exceeds the authorization period during use, the server sends a prompt message to the diagnosis device, to remind the user to obtain authorization again. Based on the above embodiment, taken the VIN code of LSGKE5411LW05883 as an example, after it is determined that the vehicle corresponding to the VIN code has the authorization qualification of the target diagnosis software, the user may obtain and use the target diagnosis software by the diagnosis device. If the user's usage period on the target diagnosis software is from 14:00 Apr. 5, 2020 to 20:00 Apr. 5, 2020, and when the target diagnosis software is used by the user until 19:01 Apr. 5, 2020, which means the usage period has exceeded the authorization period that is from 19:00, Apr. 4, 2020 to 19:00, Apr. 5, 2020, the server determines that the usage period of the target diagnosis software has exceeded the authorization period, and then sends a prompt message to the diagnosis device, so as to remind the user to obtain authorization again. The way for the user to regain authorization includes but is not limited to, purchase, time-sharing lease and transfer. If the user obtains authorization again, the diagnosis device is allowed to continue to use the target diagnosis software. If the user does not regain authorization, the diagnosis device is terminated from using the target diagnosis software.

In a preferred embodiment, a remaining authorization period threshold may be preset based on an actual requirement to send a reminder for determining whether remaining time of the usage period reaches the preset remaining authorization period threshold. If the remaining time of the usage period reaches the preset remaining authorization period threshold, a prompt message is sent to the diagnosis device, to remind the user that the usage period has reached the preset remaining authorization period threshold and the user needs to obtain authorization again. If the user's new authorization information is not obtained when the authorization period expires, the user's use will be terminated. Continuing the above example, the authorization period is from 19:00, Apr. 4, 2020 to 19:00, Apr. 5, 2020, and the preset remaining authorization period threshold for sending a reminder is 30 minutes. Then, when the target diagnosis software is used by the user until 18:30, Apr. 5, 2020, the server sends the reminder to the diagnosis device, to remind the user to obtain authorization again. If the user regains authorization at 19:00 Apr. 5, 2020, the user may continue using the target diagnosis software via the diagnosis device within the new authorization period. If the user does not regain authorization at 19:00 Apr. 5, 2020, the server stops the diagnosis device using the target diagnosis software until the user regains authorization. By sending the prompt message to the diagnosis device, the user may obtain new authorization of the target diagnosis software in time, which ensures that the user can continuously use the target diagnosis software via the diagnosis device, improves the user experience and ensures the user to complete the diagnosis of the target vehicle.

In step S203, an operation is performed based on a determination result.

Specifically, if the determination result is that the target vehicle has the authorization qualification of the target diagnosis software, the target diagnosis software is sent to the diagnosis device, for the diagnosis device to configure the target diagnosis software. If the determination result is that the target vehicle does not have the authorization qualification of the target diagnosis software, an authorization prompt message is sent to the diagnosis device for the user to determine whether it is necessary to obtain authorization.

Based on the above embodiment, if the acquisition request includes the VIN code of LSGKE5411LW05883, and the server determines that the vehicle has the authorization qualification of the target diagnosis software which is the diagnosis software for Buick™ Excelle EXCELLE 2019, a software package of the target diagnosis software is sent to the diagnosis device, for the diagnosis device to configure and install the target diagnosis software. If the server determines that the vehicle does not have the authorization qualification of the target diagnosis software, a prompt message such as "you do not have the authorization qualification of the diagnosis software for Buick™ EXCELLE 2019, and please obtain authorization" is sent to the diagnosis device, to remind the user to obtain the authorization. When the user confirms that it is necessary to obtain the authorization, ways to obtain the authorization are provided, to facilitate the user to handle the authorization. The ways to obtain the authorization include but are not limited to, purchase, time-sharing lease, lease, rent and transfer from others. After the user selects one of the ways and completes the authorization, the server generates a piece of new diagnosis software authorization information based on an authorization result, and stores the new diagnosis software authorization information in the database of the diagnosis software authorization information. Meanwhile, the server sends the target diagnosis software to the diagnosis device based on the authorization obtained by the user, for the diagnosis device to configure and use the target diagnosis software.

Based on the above technical solution, in the embodiment, the server determines whether the target vehicle has the authorization qualification of the target diagnosis software based on the acquisition request, and obtains a determination result. Only the target vehicle with the authorization qualification can download the software, and realize the flexible configuration of the diagnosis device, which can configure the diagnosis device based on the actual requirement of the user to complete the vehicle diagnosis, and reduce a waste of resources.

Figure 3:
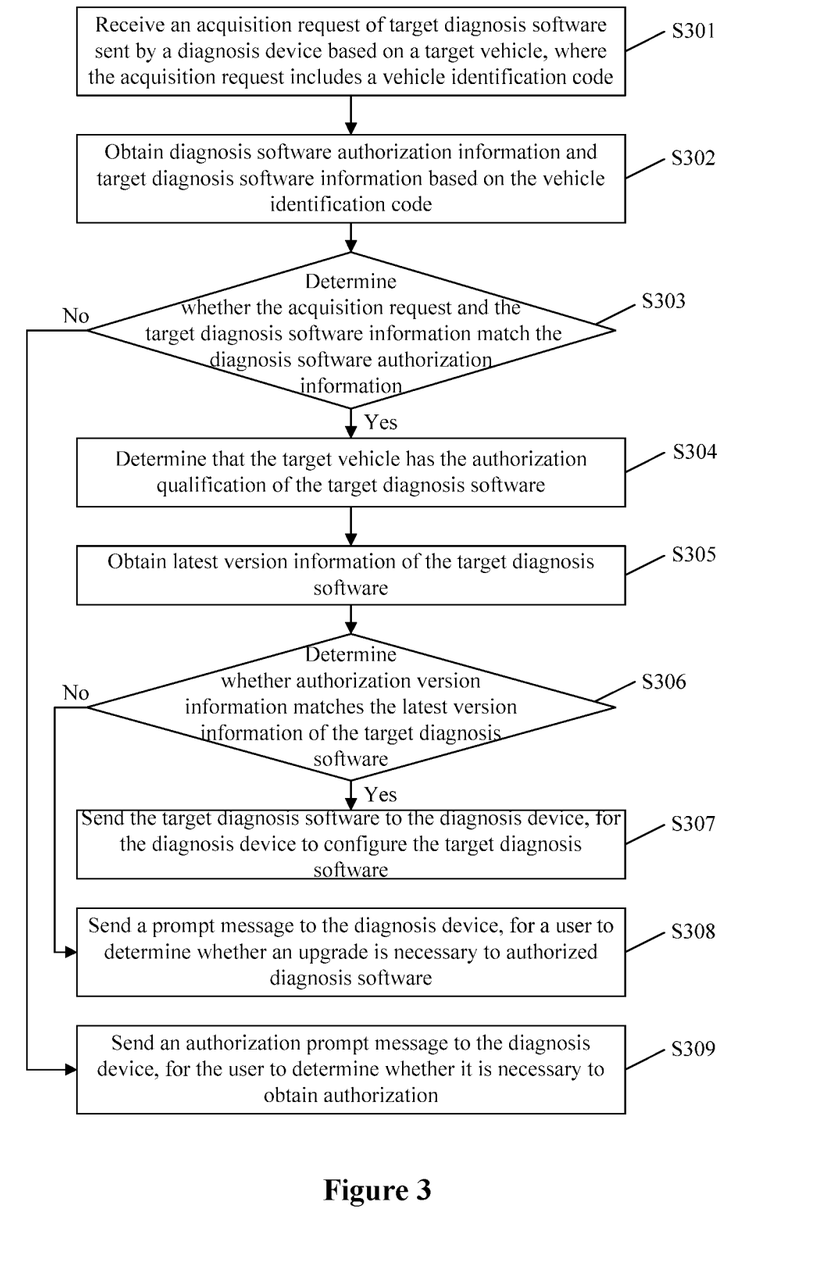
FIG. 3 is a flowchart showing a method for obtaining vehicle diagnosis software according to another embodiment of the present disclosure.

FIG. 3 is a flowchart showing a method for obtaining vehicle diagnosis software according to another embodiment of the present disclosure. The method is mainly applied to a server and includes steps S301 to S309.

In step S301, an acquisition request of target diagnosis software sent by a diagnosis device based on a target vehicle is received, where the acquisition request includes a vehicle identification code.

Step S301 is the same as step S201, which will not be repeated here.

In step S302, diagnosis software authorization information and target diagnosis software information are obtained based on the vehicle identification code.

Specifically, a vehicle type of the target vehicle may be determined based on the vehicle identification code, thus to determine the target diagnosis software information corresponding to the target vehicle. A VIN code is taken as the vehicle identification code for illustration. For example, the VIN code of the target vehicle is LSGKE5411LW058831, it may be determined based on the VIN code that the vehicle type is Buick™ EXCELLE 2019, and further determined that the corresponding target diagnosis software is the diagnosis software for Buick™ EXCELLE 2019. In another example, the VIN code of the target vehicle is LVSHCAAN9FE249549, it is determined based on the VIN code that the vehicle type is Ford™ FOCUS 2015, and further determined that the corresponding target diagnosis software is the diagnosis software for Ford™ FOCUS 2015. The determination of the target diagnosis software information based on the vehicle identification code has following ways. One way is that the target diagnosis software information is determined after the diagnosis device obtains the vehicle identification code, then packaged into the acquisition request of the target diagnosis software and sent to the server. The other way is that the target diagnosis software information is not determined by the diagnosis device but determined by the server based on the vehicle identification code in the acquisition request sent by the diagnosis device, which is not limited herein.

In a specific embodiment, the server pre-stores a database of the diagnosis software authorization information based on the vehicle identification code. The database of the diagnosis software authorization information includes a large number of vehicle identification codes and diagnosis software authorization information, and pre-establishes a mapping relationship between the vehicle identification codes and diagnosis software authorization information. One vehicle identification code may correspond to one piece of diagnosis software authorization information, or correspond to multiple pieces of diagnosis software authorization information. After receiving the acquisition request of the target diagnosis software, the server queries, based on the vehicle identification code in the acquisition request, whether there is the vehicle identification code in the information database. If the vehicle identification code is in the database, it is to further determine the diagnosis software authorization information based on the mapping relationship. A VIN code is taken as the vehicle identification code for further illustration. After the server receives the acquisition request of the target diagnosis software, if it is determined by analysis that the VIN code is LSGKE5411LW058831, the server first queries whether the VIN code is in the information database. If the VIN code is in the database, it is to further determine the diagnosis software authorization information based on the mapping relationship. If the VIN code is not in the database, it is determined that the target vehicle does not have an authorization qualification of the target diagnosis software.

In step S303, it is determined whether the acquisition request and the target diagnosis software information match the diagnosis software authorization information.

If the target diagnosis software information is consistent with the diagnosis software authorization information, it is considered that the target diagnosis software information matches the diagnosis software authorization information. For example, based on the above embodiment, it is determined based on the vehicle identification code that the target diagnosis software information is the diagnosis software for Buick™ EXCELLE 2019, and the authorized diagnosis software information in the diagnosis software authorization information also includes the diagnosis software for Buick™ EXCELLE 2019, then it is considered that the target diagnosis software information matches the diagnosis software authorization information. In some preferred embodiments, it may be further determined whether requested usage period in the acquisition request matches an authorization period. Only when the target diagnosis software information is consistent with the authorized diagnosis software information, and the requested usage period falls within the authorization period, it can be considered that the target diagnosis software information matches the diagnosis software authorization information. Else, it is considered that the target diagnosis software information does not match the diagnosis software authorization information.

If the acquisition request and the target diagnosis software information match the diagnosis software authorization information, proceed to step S304; if the acquisition request and the target diagnosis software information do not match the diagnosis software authorization information, proceed to step S309.

In step S304, it is determined that the target vehicle has an authorization qualification of the target diagnosis software.

If the acquisition request and the target diagnosis software information match the diagnosis software authorization information, it is determined that the target vehicle has the authorization qualification of the target diagnosis software.

In step S305, latest version information of the target diagnosis software is obtained.

Specifically, the server may obtain the latest version information of the target diagnosis software from a diagnosis software database.

In step S306, it is determined whether authorization version information matches the latest version information of the target diagnosis software.

If the authorization version information matches the latest version information of the target diagnosis software, proceed to step S307; if the authorization version information does not match the latest version information of the target diagnosis software, proceed to step S308.

Specifically, the diagnosis software authorization information further includes the authorization version information. It may be determined whether the authorization version information matches the obtained latest version information of the target diagnosis software by comparing them to see whether the authorization version information is consistent with the latest version information of the target diagnosis software. Based on the above embodiment, it is determined based on the vehicle identification code of LSGKE5411LW058831 that the target diagnosis software is the diagnosis software for Buick™ EXCELLE 2019, and the authorized diagnosis software is also the diagnosis software for Buick™ EXCELLE 2019 and the authorization version is V2.0. If the latest version information of the target diagnosis software obtained from the diagnosis software database of the server is the diagnosis software V2.0 for Buick™ EXCELLE 2019, since the latest version information is consistent with the authorization version information, it is determined that the authorization version information matches the latest version information of the target diagnosis software. If the latest version information of the target diagnosis software obtained from the diagnosis software database of the server is the diagnosis software V3.0 for Buick® EXCELLE 2019, since the latest version information is not consistent with the authorization version information, it is determined that the authorization version information does not match the latest version information of the target diagnosis software.

In step S307, the target diagnosis software is sent to the diagnosis device, for the diagnosis device to configure the target diagnosis software.

If it is determined that the latest version information matches the authorization version information, the server sends a software package of the target diagnosis software to the diagnosis device, for the diagnosis device to install and use the target diagnosis software.

In step S308, if the latest version information does not match the authorization version information, a prompt message is sent to the diagnosis device, for a user to determine whether an upgrade is necessary to the authorized diagnosis software.

If the latest version information does not match the authorization version information, for example, the latest version information of the target diagnosis software obtained by the server is the diagnosis software V3.0 for Buick™ EXCELLE 2019, while the authorized diagnosis software is the diagnosis software V2.0 for Buick™ EXCELLE 2019, then the server sends to the diagnosis device a prompt message, such as "your authorization version of the diagnosis software is lower, and whether to upgrade to the latest version", for the user to confirm whether an upgrade is necessary to the authorized diagnosis software.

Further, if the user confirms to upgrade, the diagnosis device sends an upgrade request to the server based on the user's instruction. When receiving the upgrade request, the server determines whether an upgrade authority is included in the diagnosis software authorization information. If the diagnosis software authorization information includes the upgrade authority, an latest version of the target diagnosis software is sent to the diagnosis device, for the diagnosis device to configure the target diagnosis software and update the authorization version information of the authorized diagnosis software. If the diagnosis software authorization information does not include the upgrade authority, an upgrade prompt message is sent to the diagnosis device, to remind the user to obtain the upgrade authority.

Specifically, if the user confirms to upgrade, the server first determines whether the user has the upgrade authority after receiving the upgrade request sent by the diagnosis device. If the user has the upgrade authority, the latest version of the target diagnosis software such as the diagnosis software V3.0 for Buick™ EXCELLE 2019 is sent to the diagnosis device, for the diagnosis device to install and configure the diagnosis software, and meanwhile, the server updates the diagnosis software authorization information to the diagnosis software V3.0 for Buick™ EXCELLE 2019. If it is determined that the user does not have the upgrade authority, the upgrade prompt message such as "you do not have an upgrade authority, and please obtain the upgrade authority before upgrading the software" is sent to the diagnosis device, to remind the user to obtain the upgrade authority. After the user obtains the upgrade authority, the latest version information of the target diagnosis software is sent to the diagnosis device, and the authorization version information in the diagnosis software authorization information is updated. If the user does not agree to obtain the upgrade authority, an original version of the target diagnosis software is sent to the diagnosis device, and the version information of the authorized diagnosis software is not updated.

In step S309, an authorization prompt message is sent to the diagnosis device, for the user to determine whether it is necessary to obtain authorization.

Step S309 may be referred to the operation without the authorization qualification in step S203, which will not be repeated here.

In the embodiment, after determining that the user has the authorization qualification of the target diagnosis software based on the vehicle identification code, the server may also compare the latest version of the target diagnosis software and the authorization version to see whether the two are consistent, and remind the user to upgrade in case of inconsistency, for the user to obtain the latest version of the target diagnosis software, which further improves the user experience.

Figure 4:
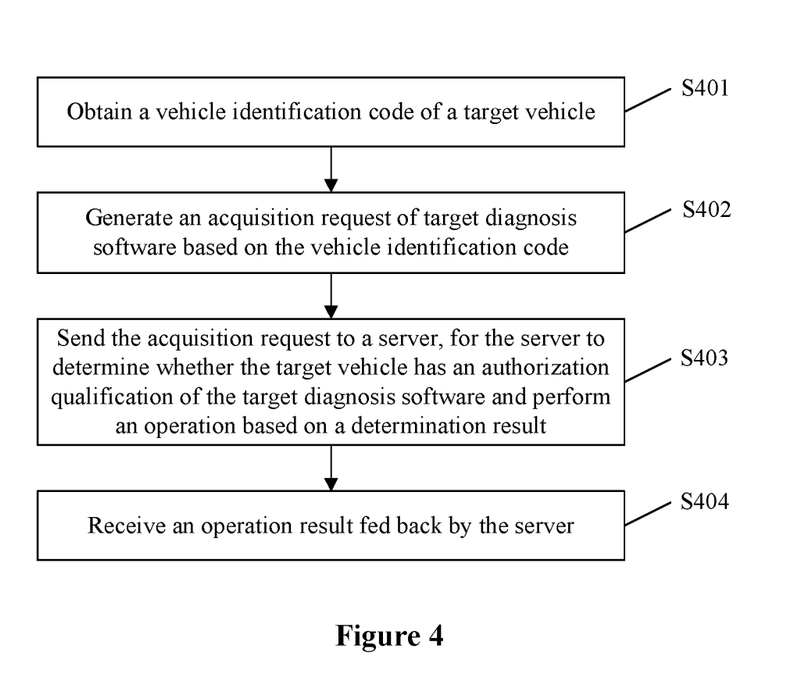
FIG. 4 is a flowchart showing a method for obtaining vehicle diagnosis software according to another embodiment of the present disclosure.

FIG. 4 is a flowchart showing a method for obtaining vehicle diagnosis software according to another embodiment of the present disclosure. The method is applied to a diagnosis device, and the diagnosis device may be a terminal with a function of loading diagnosis software and performing vehicle diagnosis, such as a handheld device, a mobile terminal or a personal digital assistant. The method includes steps S401 to S404.

In step S401, a vehicle identification code of a target vehicle is obtained.

In step S402, an acquisition request of target diagnosis software is generated based on the vehicle identification code.

In step S403, the acquisition request is sent to a server, for the server to determine whether the target vehicle has an authorization qualification of the target diagnosis software and perform an operation based on a determination result.

In step S404, an operation result fed back by the server is received.

Specifically, the vehicle identification code includes but is not limited to, a VIN code, a license plate, and a two-dimensional code that uniquely marks the vehicle. The VIN code may be obtained by a user inputting on an interface of the diagnosis device, or by photographing, or by automatic scanning after the diagnosis device is connected with an on-Board diagnostics (OBD), which is not limited herein. The license plate may be obtained by the user inputting on the interface of the diagnosis device, or by photographing. The two-dimensional code that uniquely marks the vehicle may be obtained by the diagnosis device through scanning and recognition.

Specifically, a vehicle type of the target vehicle may be determined based on the vehicle identification code, thus to determine the target diagnosis software information corresponding to the target vehicle. A VIN code is taken as the vehicle identification code for illustration. For example, the VIN code of the target vehicle is LSGKE5411LW058831, it may be determined based on the VIN code that the vehicle type is Buick™ EXCELLE 2019, and further determined that the corresponding target diagnosis software is the diagnosis software for Buick™ EXCELLE 2019. In another example, the VIN code of the target vehicle is LVSHCAAN9FE249549, it is determined based on the VIN code that the vehicle type is Ford™ FOCUS 2015, and further determined that the corresponding target diagnosis software is the diagnosis software for Ford™ FOCUS 2015. The determination of the target diagnosis software information based on the vehicle identification code has following ways. One way is that the target diagnosis software information is determined after the diagnosis device obtains the vehicle identification code, then packaged into the acquisition request of the target diagnosis software and sent to the server. The other way is that the target diagnosis software information is not determined by the diagnosis device but determined by the server based on the vehicle identification code in the acquisition request sent by the diagnosis device, which is not limited herein.

In a specific embodiment, the acquisition request of the target diagnosis software includes the vehicle identification code, target diagnosis software information and requested usage period. The target diagnosis software information is determined by the diagnosis device analyzing the vehicle identification code. After the acquisition request is sent by the diagnosis device to the server, the server obtains the diagnosis software information based on the vehicle identification code and determines whether the acquisition request, the target diagnosis software information match the diagnosis software authorization information. If the acquisition request and the target diagnosis software information match the diagnosis software authorization information, it is determined that the target vehicle has the authorization qualification. In another embodiment, the acquisition request of the target diagnosis software includes the vehicle identification code and requested usage period. After the acquisition request is sent by the diagnosis device to the server, the server determines the target diagnosis software information by analyzing the vehicle identification code, and obtains diagnosis software authorization information based on the vehicle identification code. It is determined whether the acquisition request and the target diagnosis software information match the diagnosis software authorization information. If the acquisition request and the target diagnosis software information match the diagnosis software authorization information, it is determined that the target vehicle has the authorization qualification, and at this time the server sends the target diagnosis software to the diagnosis device. If the acquisition request and the target diagnosis software information do not match the diagnosis software authorization information, it is determined that the target vehicle does not have the authorization qualification, and at this time the server sends an authorization prompt message to the diagnosis device, to prompt the user to obtain authorization. The process for the server to obtain the diagnosis software authorization information and the process of determining whether the acquisition request and the target diagnosis software information match the diagnosis software authorization information may refer to the description of the server in the above embodiments, which will not be repeated here.

Further, if the determination result is that the target vehicle has the authorization qualification, the diagnosis device receives the target diagnosis software sent by the server and configures the target diagnosis software for use. If the determination result is that the target vehicle does not have the authorization qualification, the diagnosis device receives the authorization prompt message sent by the server and presents the authorization prompt message to the user, for the user to determine whether it is necessary to obtain authorization.

As an example, the vehicle identification code obtained by the diagnosis device is a VIN code of LSGKE5411LW058831. When the diagnosis device generates an acquisition request of the target diagnosis software based on the VIN code and sends the acquisition request to the server, if the server determines that there is an authorization qualification, the diagnosis device will receive a software package of the target diagnosis software corresponding to the VIN code sent by the server, that is, a diagnosis software package of a diagnosis software for Buick™ EXCELLE 2019. After receiving the software package, the diagnosis device configures the target diagnosis software and then uses the target diagnosis software. If the server determines that there is no authorization qualification, the diagnosis device receives an prompt message "you do not have an authorization qualification of the diagnosis software for Buick™ EXCELLE 2019, and please obtain authorization" sent by the server. If the user determines to obtain authorization, multiple ways to obtain the authorization, such as purchase, time-sharing lease, rent and transfer from others, display on the interface of the diagnosis device. After the user selects one of the ways and completes the authorization, the server sends the target diagnosis software corresponding to the authorization to the diagnosis device, for the diagnosis device to configure and use the target diagnosis software.

Further, after the diagnosis device obtains the target diagnosis software, if usage period exceeds authorization period during use, the diagnosis device will receive an authorization expiration reminder sent by the server, such as "your authorization for the diagnosis software has expired, and please obtain authorization again". The reminder may be sent when the use time just exceeds expiration time of the authorization period, or the reminder may be sent a preset time threshold earlier than the expiration time of the authorization period, such as the reminder is sent 30 minutes earlier than the expiration time of the authorization period, which is not limited herein. If the user determines to regain the authorization by the diagnosis device, the diagnosis device continues using the target diagnosis software after the user completes the re-authorization. If the user does not regain the authorization, the diagnosis device is terminated from using the target diagnosis software.

Further, if the determination result is that there is the authorization qualification, the diagnosis device receives an upgrade prompt message of the authorized diagnosis software sent by the server and presents the upgrade prompt message to the user, for the user to determine whether an upgrade is necessary. If the user determines that the upgrade is necessary, an upgrade request is sent to the server, for the server to determine whether there is an upgrade authority. If the server determines that there is the upgrade authority, the diagnosis device receives a latest version of the target diagnosis software sent by the server and configures the target diagnosis software. If the server determines that there is no upgrade authority, the diagnosis device receives an upgrade authority reminder sent by the server and presents the upgrade authority reminder to the user, to remind the user to obtain the upgrade authority. If the user determines that the upgrade is unnecessary, the diagnosis device receives the target diagnosis software sent by the server and configures the target diagnosis software.

Specifically, if the determination result is that the target vehicle has the authorization qualification of the target diagnosis software, the server further compares whether the authorization version information is consistent with the obtained latest version information of the target diagnosis software, to determine whether the authorization version information matches the latest version information of the target diagnosis software. If the latest version information matches the authorization version information, the diagnosis device will receive the target diagnosis software sent by the server, to configure and use the target diagnosis software. If the latest version information does not match the authorization version information, the diagnosis device will receive an upgrade reminder, such as "your authorization version of the diagnosis software is lower, and whether to upgrade to the latest version" sent by the server, and present the upgrade reminder to the user. If the user determines to upgrade, the diagnosis device sends an upgrade request to the server based on the user's instruction, for the server to determine whether an upgrade authority is included in the diagnosis software authorization information. In a case that the diagnosis software authorization information has the upgrade authority, the diagnosis device will receive a latest version of the target diagnosis software sent by the server, and configure the target diagnosis software for use. If the diagnosis software authorization information does not include the upgrade authority, the diagnosis device will receive an upgrade authority acquisition prompt message such as "you do not have an upgrade authority, and please obtain the upgrade authority before upgrading the software" sent by the server, and present the upgrade authority acquisition prompt message to the user. After the user determines to obtain the upgrade authority and has obtained the upgrade authority, the diagnosis device will receive the latest version of the target diagnosis software sent by the server, and configure the target diagnosis software for use. If the user determines not to obtain the upgrade authority, the diagnosis device obtains an authorization version of authorized diagnosis software, and configures the authorized diagnosis software for use.

In the embodiment, the diagnosis device configures and uses the diagnosis software by the vehicle identification code, which can realize the private use of the diagnosis software, flexibly adjust the configuration of the diagnosis device, and make the utilization rate of the diagnosis software higher and make the user experience better.

Figure 5:
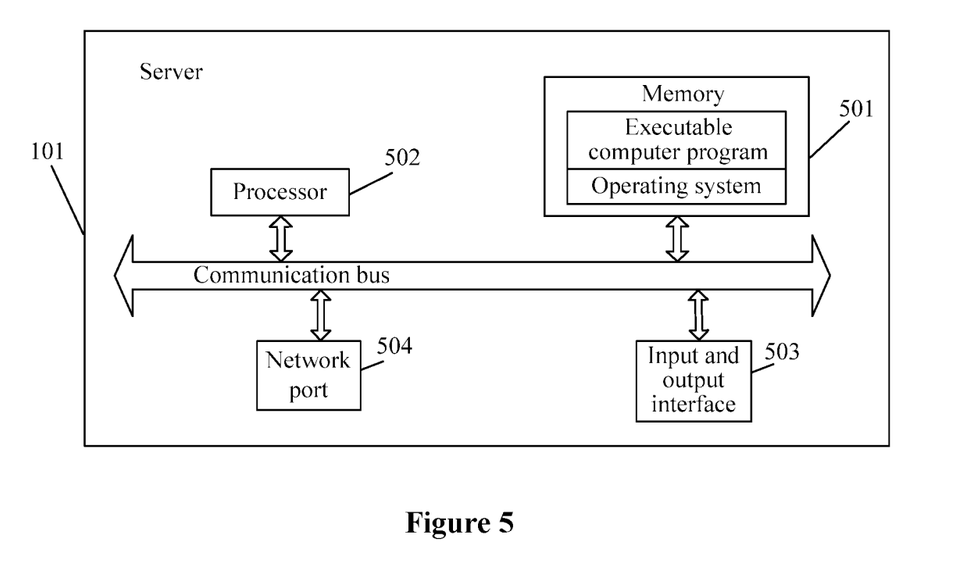
FIG. 5 is a schematic structural diagram showing a server according to an embodiment of the present disclosure.

A server according to an embodiment of the present disclosure is described as follows. Reference is made to FIG. 5, which is a schematic structural diagram of a server according to an embodiment of the present disclosure. The server includes a memory 501, a processor 502, an input and output interface 503 and a network port 504.

The memory 501 includes a non-volatile storage medium and an internal memory. The non-volatile storage medium stores an operating system and computer-readable instructions, and the internal memory provides an operation environment for the operating system and computer-readable instructions in the non-volatile storage medium. The processor 502 may be a central processing unit (CPU), or a general-purpose processor, a digital signal processor (DSP), an application specific integrated circuit (ASIC), a field-programmable gate array (FPGA), a programmable logic device, a discrete gate, a transistor logic device, a discrete hardware component and the like. The general-purpose processor may be a microprocessor or any regular processor and the like. The processor 502 provides computing and control capabilities for the server 101, and executes a computer program stored in the memory 501, to perform steps of the method for obtaining the vehicle diagnosis software. The input and output interface 503 is configured to obtain computer program, parameters and instructions imported from the outside, which are controlled by the processor 502 to be stored in the memory 501. The input and output interface 503 may be connected with an input apparatus to receive parameters or instructions manually inputted by a user. The input apparatus may be a touch screen, a keyboard, a touch pad or a mouse and the like. The user may start the method for obtaining the vehicle diagnosis software via the input and output interface 503. The network port 504 is configured to communicate with external terminal apparatuses. The communication technology used in the communication connection may be a wired communication technology or a wireless communication technology, such as a mobile high-definition link (MHL) technology, an universal serial bus (USB), a high definition multimedia interface (HDMI), a wireless fidelity (Wi-Fi) technology, a Bluetooth™ communication technology, a low power Bluetooth™ communication technology, a communication technology based on IEEE 802.11s. Specifically, in the embodiment, under normal networking condition, it may be interacted with the diagnosis device 102 through the network port 504 to realize an authentication.

Specifically, the memory 501 is configured to store an executable computer program.

The processor 502 is configured to call the executable computer program to perform the following steps:
  receive an acquisition request of target diagnosis software sent by a diagnosis device based on a target vehicle, where the acquisition request includes a vehicle identification code;
  determine whether the target vehicle has an authorization qualification of the target diagnosis software based on the acquisition request, to obtain a determination result; and
  perform an operation based on the determination result.

In an embodiment, the acquisition request further includes requested usage period of the target diagnosis software, and diagnosis software authorization information includes authorized diagnosis software information and an authorization period. The processor 502 is further configured to call the executable computer program to perform the following steps:
  obtain diagnosis software authorization information and target diagnosis software information based on the vehicle identification code;
  determine whether the acquisition request and the target diagnosis software information match the diagnosis software authorization information; and
  determine that the target vehicle has the authorization qualification of the target diagnosis software, if the acquisition request and the target diagnosis software information match the diagnosis software authorization information.

In an embodiment, the processor 502 is further configured to call the executable computer program to perform the following steps:
  determine whether the target diagnosis software information matches the authorized diagnosis software information;
  determine whether the requested usage period falls within the authorization period, if the target diagnosis software information matches the authorized diagnosis software information; and
  determine that the target vehicle has the authorization qualification of the target diagnosis software, if the requested usage period falls within the authorization period.

In an embodiment, the processor 502 is further configured to call the executable computer program to perform the following steps:
  send a prompt message to the diagnosis device to remind the user to obtain authorization again, if the requested usage period of the target diagnosis software exceeds the authorization period.

In an embodiment, the diagnosis software authorization information further includes authorization version information, and the processor 502 is further configured to call the executable computer program to perform the following steps:
  obtain latest version information of the target diagnosis software;
  determine whether the authorization version information matches the latest version information of the target diagnosis software; and
  send a prompt message to the diagnosis device, for the user to determine whether an upgrade is necessary to the authorized diagnosis software, if the authorization version information does not match the latest version information of the target diagnosis software.

In an embodiment, the processor 502 is further configured to call the executable computer program to perform the following steps:
  determine whether the diagnosis software authorization information includes an upgrade authority, if an upgrade request sent by the diagnosis device is received;
  send the latest version of the target diagnosis software to the diagnosis device, for the diagnosis device to configure the target diagnosis software and upgrade the authorization version information of the authorized diagnosis software, if the diagnosis software authorization information includes the upgrade authority; and
  send an upgrade prompt message to the diagnosis device to remind the user to obtain the upgrade authority, if the diagnosis software authorization information does not include the upgrade authority.

In an embodiment, the processor 502 is further configured to call the executable computer program to perform the following steps:
  send the target diagnosis software to the diagnosis device, for the diagnosis device to configure the target diagnosis software, if the determination result is that the target vehicle has the authorization qualification of the target diagnosis software; and
  send an authorization prompt message to the diagnosis device, for the user to determine whether it is necessary to obtain the authorization, if the determination result is that the target vehicle does not have the authorization qualification of the target diagnosis software.

Since the embodiment of the server corresponds to the embodiment of the method for obtaining the vehicle diagnosis software each other, the embodiment of the server may refer to description of the embodiment of the method for obtaining the vehicle diagnosis software, which will not be repeated here.

Based on the above technical solution, in the embodiment, the server determines whether the target vehicle has the authorization qualification of the target diagnosis software based on the acquisition request, and obtains a determination result. Only with the authorization qualification can the software be downloaded, to realize the flexible configuration of the diagnosis device. Therefore, the diagnosis device is configured based on the actual requirement of the user to complete the vehicle diagnosis, thus reducing a waste of resources.

Figure 6:
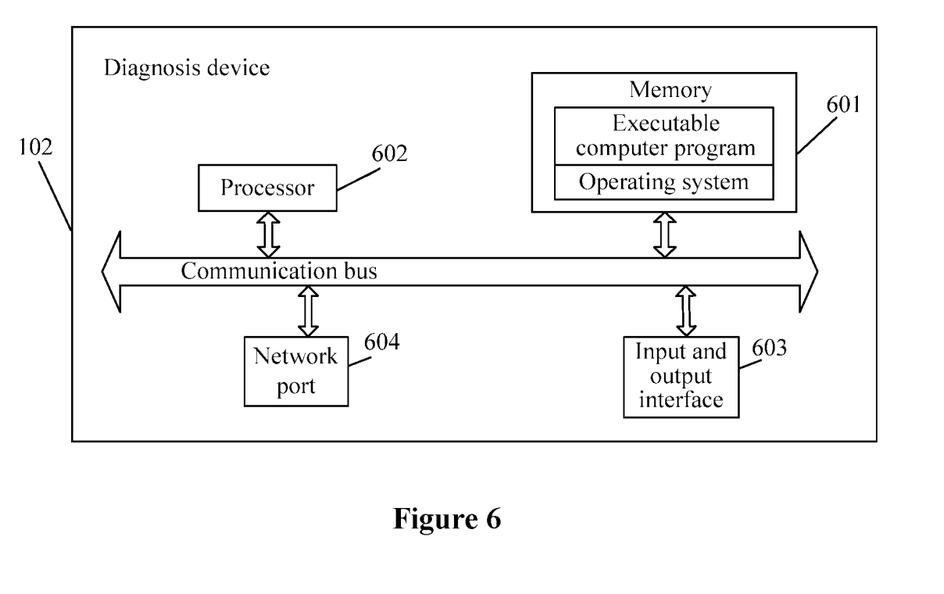
FIG. 6 is a schematic structural diagram showing a diagnosis device according to an embodiment of the present disclosure.

Reference is made to FIG. 6, which is a schematic structural diagram of a diagnosis device according to an embodiment of the present disclosure. The diagnosis device includes a memory 601, a processor 602, an input and output interface 603 and a network port 604.

The memory 601 includes a non-volatile storage medium and an internal memory. The non-volatile storage medium stores an operating system and computer-readable instructions, and the internal memory provides an operation environment for the operating system and computer-readable instructions in the non-volatile storage medium. The processor 602 may be a central processing unit (CPU), or a general-purpose processor, a digital signal processor (DSP), an application specific integrated circuit (ASIC), a field-programmable gate array (FPGA), a programmable logic device, a discrete gate, a transistor logic device, a discrete hardware component and the like. The general-purpose processor may be a microprocessor or any regular processor and the like. The processor 602 provides computing and control capabilities for the diagnosis device 102, and executes a computer program stored in the memory 601, to perform steps of the method for obtaining the vehicle diagnosis software. The input and output interface 603 is configured to obtain computer program, parameters and instructions imported from the outside, which are controlled by the processor 602 to be stored in the memory 601. The input and output apparatus may be a touch screen, a keyboard, a touch pad or a mouse and the like. The input and output interface 603 may be connected with an output apparatus to output parameters or instructions fed back by the server 101. The output apparatus may be a display, an audio or the like. The user may start the method for obtaining the vehicle diagnosis software via the input and output interface 603. The network port 604 is configured to communicate with external terminal apparatuses. The communication technology used in the communication connection may be a wired communication technology or a wireless communication technology, such as a mobile high-definition link (MHL) technology, an universal serial bus (USB), a high definition multimedia interface (HDMI), a wireless fidelity (Wi-Fi) technology, a Bluetooth™ communication technology, a low power Bluetooth™ communication technology, a communication technology based on IEEE 802.11s. Specifically, in the embodiment, under normal networking condition, it may be interacted with the server 101 through the network port 604 to realize an authentication.

Specifically, the memory 601 is configured to store an executable computer program.

The processor 602 is configured to call the executable computer program to perform the following steps:
  obtain a vehicle identification code of a target vehicle;
  generate an acquisition request of target diagnosis software based on the vehicle identification code;
  send the acquisition request to a server, for the server to determine whether the target vehicle has an authorization qualification of the target diagnosis software, and perform an operation based on a determination result; and
  receive an operation result fed back by the server.

In an embodiment, the processor 602 is further configured to call the executable computer program to perform the following steps:
  receive the target diagnosis software sent by the server and configure the target diagnosis software, if the determination result is that the target vehicle has the authorization qualification of the target diagnosis software; and
  receive an authorization prompt message sent by the server, and present the authorization prompt message to the user, for the user to determine whether it is necessary to obtain authorization, if the determination result is that the target vehicle does not have the authorization qualification of the target diagnosis software.

In an embodiment, the processor 602 is further configured to call the executable computer program to perform the following steps:
  receive an upgrade prompt message of the authorized diagnosis software sent by the server and present the upgrade prompt message to the user, for the user to determine whether an upgrade is necessary;
  send, if the user determines to upgrade, an upgrade request to the server, for the server to determine whether there is an upgrade authority, and receive a latest version of the target diagnosis software sent by the server and configure the target diagnosis software if the server determines that there is the upgrade authority; receive an upgrade authority reminder sent by the server and presents the upgrade authority reminder to the user to remind the user to obtain the upgrade authority if the server determines that there is no upgrade authority; and
  receive, if the user determines not to upgrade, the target diagnosis software sent by the server and configure the target diagnosis software.

Since the embodiment of the diagnosis device corresponds to the embodiment of the method for obtaining the vehicle diagnosis software each other, the embodiment of the diagnosis device may refer to description of the embodiment of the method for obtaining the vehicle diagnosis software, which will not be repeated herein.

In the embodiment, the diagnosis device configures and uses the diagnosis software based on the vehicle identification code, which can realize private use of the diagnosis software, flexibly adjust the configuration of the diagnosis device, and make the utilization rate of the diagnosis software higher and make the user experience better.

Embodiments in the specification are described in progressive manner. Each embodiment mainly focuses on an aspect different from other embodiments, and reference may be made to these similar parts among the embodiments. The apparatus disclosed in the embodiment corresponds to the method disclosed in the embodiment, and thus is described relatively simple. The relevant part may be referred to the description of the method part.

It may be known by those skilled in the art that, units and algorithm steps in each example described in conjunction with the embodiments disclosed herein may be implemented by electronic hardware, computer software or a combination thereof. In order to clearly illustrate interchangeability of the hardware and the software, compositions and steps of each example have been described generally with regard to functions in the above description. Whether the function is executed in a hardware way or in a software way depends on a specific application of the technical solution and design constraint condition. Those skilled in the art may use different method for each specific application to implement the described function, and such implementation should not be considered beyond the scope of the present disclosure.

The steps of the method or algorithm described in embodiments of the present disclosure may be implemented directly with hardware, software modules executed by processors, or a combination of the hardware and the software modules. The software modules may be stored in random access memory (RAM), memory, read-only memory (ROM), electrically programmable ROM, electrically erasable programmable ROM, register, hard disk, removable disk, CD-ROM, or any other form of storage medium well known in the technical field.

The method for obtaining vehicle diagnostic software, the server, and the diagnostic device according to the present disclosure are described in detail above. Specific examples are used herein to describe the principles and implementations of the present disclosure. The description of the above embodiments is only used to help understand the method and core ideas of the present disclosure. It should be noted that those ordinary skilled in the art may also make several improvements and modifications to the present disclosure without departing from the principles of the present disclosure, and these improvements and modifications also fall within the protection scope of the claims of the present disclosure.

The invention claimed is:

1. A method for obtaining vehicle diagnosis software, applied to a server, and comprising:
    receiving an acquisition request of target diagnosis software sent by a diagnosis device based on a target vehicle, wherein the acquisition request comprises a vehicle identification code and a requested usage period of the target diagnosis software;
    determining whether the target vehicle has an authorization qualification of the target diagnosis software, based on the acquisition request, to obtain a determination result; and
    performing an operation based on the determination result;
    wherein determining whether the target vehicle has the authorization qualification of the target diagnosis software based on the acquisition request to obtain the determination result comprises:
    obtaining diagnosis software authorization information and target diagnosis software information based on the vehicle identification code, wherein the diagnosis software authorization information comprises authorized diagnosis software information and an authorization period;
    determining whether the target diagnosis software information matches the authorized diagnosis software information;
    determining whether the requested usage period falls within the authorization period, if the target diagnosis software information matches the authorized diagnosis software information; and
    determining that the target vehicle has the authorization qualification of the target diagnosis software, in response to the target diagnosis software information matching the authorized diagnosis software information and the requested usage period falling within the authorization period;
    wherein the method further comprises:
    sending a prompt message to the diagnosis device to remind a user to obtain authorization again, if the requested usage period of the target diagnosis software exceeds the authorization period.

2. The method for obtaining vehicle diagnosis software according to claim 1, wherein the diagnosis software authorization information further comprises authorization version information, wherein after determining that the target vehicle has the authorization qualification of the target diagnosis software, the method further comprises:
    obtaining latest version information of the target diagnosis software;
    determining whether the authorization version information matches the latest version information of the target diagnosis software; and
    sending another prompt message to the diagnosis device, for the user to determine whether an upgrade is necessary to authorized diagnosis software, if the authorization version information does not match the latest version information of the target diagnosis software.

3. The method for obtaining vehicle diagnosis software according to claim 2, further comprising:
    determining whether the diagnosis software authorization information comprises an upgrade authority, in response to receiving an upgrade request sent by the diagnosis device;
    sending a latest version of the target diagnosis software to the diagnosis device, for the diagnosis device to configure the target diagnosis software and upgrade the authorization version information of the authorized diagnosis software, if the diagnosis software authorization information comprises the upgrade authority; and
    sending an upgrade prompt message to the diagnosis device to remind the user to obtain the upgrade authority, if the diagnosis software authorization information does not comprise the upgrade authority.

4. The method for obtaining vehicle diagnosis software according to claim 1, wherein performing the operation based on the determination result comprises:
    sending the target diagnosis software to the diagnosis device, for the diagnosis device to configure the target diagnosis software, if the determination result is that the target vehicle has the authorization qualification; and
    sending an authorization prompt message to the diagnosis device, for the user to determine whether it is necessary to obtain authorization, if the determination result is that the target vehicle does not have the authorization qualification.

5. A method for obtaining vehicle diagnosis software, applied to a diagnosis device and comprising:
    obtaining a vehicle identification code of a target vehicle;
    generating an acquisition request of target diagnosis software based on the vehicle identification code, wherein the acquisition request comprises a requested usage period of the target diagnosis software;
    sending the acquisition request to a server to enable the server to:
        obtain diagnosis software authorization information and target diagnosis software information based on the vehicle identification code, wherein the diagnosis software authorization information comprises authorized diagnosis software information and an authorization period;

determine whether the target diagnosis software information matches the authorized diagnosis software information;

determine whether the requested usage period falls within the authorization period, if the target diagnosis software information matches the authorized diagnosis software information;

determine that the target vehicle has an authorization qualification of the target diagnosis software, in response to the target diagnosis software information matching the authorized diagnosis software information and the requested usage period falling within the authorization period; and perform an operation based on a determination result; and receiving an operation result fed back by the server;

wherein the method further comprises:

receiving a prompt message from the server if the requested usage period of the target diagnosis software exceeds the authorization period, wherein the prompt message is configured to remind a user to obtain authorization again.

6. The method for obtaining vehicle diagnosis software according to claim 5, further comprising:

receiving the target diagnosis software sent by the server and configuring the target diagnosis software, if the determination result is that the target vehicle has the authorization qualification; and receiving an authorization prompt message sent by the server, and presenting the authorization prompt message to the user, for the user to determine whether it is necessary to obtain authorization, if the determination result is that the target vehicle does not have the authorization qualification.

7. The method for obtaining vehicle diagnosis software according to claim 6, wherein after determining that the target vehicle has the authorization qualification, the method further comprises:

receiving an upgrade prompt message of authorized diagnosis software sent by the server and presenting the upgrade prompt message to the user, for the user to determine whether an upgrade is necessary;

sending an upgrade request to the server, for the server to determine whether there is an upgrade authority, if the user determines that the upgrade is necessary, receiving a latest version of the target diagnosis software sent by the server and configuring the latest version of the target diagnosis software in a case that the server determines that there is the upgrade authority;

receiving an upgrade authority prompt sent by the server and presenting the upgrade authority prompt to the user to remind the user to obtain the upgrade authority in a case that the server determines that there is no upgrade authority; and receiving the target diagnosis software sent by the server and configuring the target diagnosis software, if the user determines that the upgrade is not necessary.

8. A diagnosis device, which is the diagnosis device to which the method according to claim 5 is applied, comprising:

a memory, configured to store an executable computer program; and a processor, configured to call the executable computer program to perform the method according to claim 5.

9. The diagnosis device according to claim 8, wherein the processor is configured to call the executable computer program to:

receive the target diagnosis software sent by the server and configure the target diagnosis software, if the determination result is that the target vehicle has the authorization qualification; and receive an authorization prompt message sent by the server, and presenting the authorization prompt message to the user, for the user to determine whether it is necessary to obtain authorization, if the determination result is that the target vehicle does not have the authorization qualification.

10. The diagnosis device according to claim 9, wherein the processor is configured to call the executable computer program to:

receive an upgrade prompt message of authorized diagnosis software sent by the server and present the upgrade prompt message to the user, for the user to determine whether an upgrade is necessary;

send an upgrade request to the server, for the server to determine whether there is an upgrade authority if the user determines that the upgrade is necessary, receive a latest version of the target diagnosis software sent by the server and configure the latest version of the target diagnosis software in a case that the server determines that there is the upgrade authority; receive an upgrade authority prompt sent by the server and present the upgrade authority prompt to the user to remind the user to obtain the upgrade authority in a case that the server determines that there is no upgrade authority; and receive the target diagnosis software sent by the server and configure the target diagnosis software if the user determines that the upgrade is not necessary.

11. A server comprising:

a memory, configured to store an executable computer program; and a processor, configured to call the executable computer program to:

receive an acquisition request of target diagnosis software sent by a diagnosis device based on a target vehicle, wherein the acquisition request comprises a vehicle identification code and a requested usage period of the target diagnosis software;

determine whether the target vehicle has an authorization qualification of the target diagnosis software, based on the acquisition request, to obtain a determination result; and perform an operation based on the determination result;

wherein the processor is configured to call the executable computer program to:

obtain diagnosis software authorization information and target diagnosis software information based on the vehicle identification code, wherein the diagnosis software authorization information comprises authorized diagnosis software information and an authorization period;

determine whether the target diagnosis software information matches the authorized diagnosis software information;

determine whether the requested usage period falls within the authorization period, if the target diagnosis software information matches the authorized diagnosis software information; and determine that the target vehicle has the authorization qualification of the target diagnosis software, in response to the target diagnosis software information matching the authorized diagnosis software information and the requested usage period falling within the authorization period;

wherein the processor is further configured to call the executable computer program to: send a prompt message to the diagnosis device to remind a user to obtain authorization again, if a usage period of the target diagnosis software has exceeded the authorization period.

12. The server according to claim 11, wherein the diagnosis software authorization information further comprises authorization version information, and the processor is further configured to call the executable computer program to perform the following steps:

obtain latest version information of the target diagnosis software;

determine whether the authorization version information matches the latest version information of the target diagnosis software; and send another prompt message to the diagnosis device, for the user to determine whether an upgrade is necessary to authorized diagnosis software, if the authorization version information does not match the latest version information of the target diagnosis software.

13. The server according to claim 12, wherein the processor is further configured to call the executable computer program to:

determine whether the diagnosis software authorization information comprises an upgrade authority, in response to receiving an upgrade request sent by the diagnosis device;

send a latest version of the target diagnosis software to the diagnosis device, for the diagnosis device to configure the target diagnosis software and upgrade the authorization version information of the authorized diagnosis software, if the diagnosis software authorization information comprises the upgrade authority; and send an upgrade prompt message to the diagnosis device to remind the user to obtain the upgrade authority, if the diagnosis software authorization information does not comprise the upgrade authority.

14. The server according to claim 11, wherein the processor is further configured to call the executable computer program to:

send the target diagnosis software to the diagnosis device, for the diagnosis device to configure the target diagnosis software, if the determination result is that the target vehicle has the authorization qualification; and send an authorization prompt message to the diagnosis device, for the user to determine whether it is necessary to obtain authorization, if the determination result is that the target vehicle does not have the authorization qualification.

* * * * *